(12) United States Patent
Machimura et al.

(10) Patent No.: US 8,190,184 B2
(45) Date of Patent: May 29, 2012

(54) CONTENT REPRODUCTION SYSTEM, CONTENT REPRODUCTION APPARATUS AND CONTENT REPRODUCTION METHOD

(75) Inventors: Masanori Machimura, Tokyo (JP); Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 709 days.

(21) Appl. No.: 11/789,448

(22) Filed: Apr. 24, 2007

(65) Prior Publication Data
US 2007/0287486 A1    Dec. 13, 2007

(30) Foreign Application Priority Data

Apr. 25, 2006  (JP) ................ P2006-120776

(51) Int. Cl.
*H04B 7/00* (2006.01)
(52) U.S. Cl. ..... 455/500; 455/3.01; 455/3.02; 455/3.06; 455/41.1; 455/41.2; 709/202; 709/213; 709/216
(58) Field of Classification Search ........ 455/3.01–3.06, 455/41.1, 41.2, 550.1; 709/202, 213, 216, 709/217
See application file for complete search history.

(56) References Cited

U.S. PATENT DOCUMENTS

| | | | |
|---|---|---|---|
| 7,236,739 B2* | 6/2007 | Chang | 455/3.05 |
| 2004/0053622 A1* | 3/2004 | Nakakita et al. | 455/450 |
| 2005/0194446 A1* | 9/2005 | Wiklof et al. | 235/462.46 |
| 2007/0142090 A1* | 6/2007 | Rydenhag et al. | 455/566 |

FOREIGN PATENT DOCUMENTS

| | | |
|---|---|---|
| JP | 60173600 A | 9/1985 |
| JP | 04263528 A | 9/1992 |
| JP | 08018545 A | 1/1996 |
| JP | 09284202 A | 10/1997 |
| JP | 11220553 A | 8/1999 |
| JP | 2002539508 T | 11/2002 |
| JP | 2003022079 A | 1/2003 |
| JP | 2001236728 A | 2/2003 |
| JP | 2001265360 A | 3/2003 |
| JP | 2002311965 A | 6/2003 |
| JP | 2003264791 A | 9/2003 |
| JP | 2002373484 A | 9/2004 |
| JP | 2004304477 A | 10/2004 |
| JP | 2005-352351 A | 12/2005 |
| JP | 2005166059 A1 | 12/2006 |
| WO | 0055853 A1 | 9/2000 |
| WO | 03034776 A1 | 4/2003 |

OTHER PUBLICATIONS

Office Action from Japanese Application No. 2006-120776, dated Mar. 1, 2011.
Office Action from Japanese Application No. 2006-120776, dated Dec. 20, 2011.

* cited by examiner

*Primary Examiner* — Fayyaz Alam
(74) *Attorney, Agent, or Firm* — Lerner, David, Littenberg, Krumholz & Mentlik, LLP

(57) ABSTRACT

In a content reproduction system including a plurality of content reproduction apparatuses, at least one of the plurality of content reproduction apparatuses may include a reproducing unit configured to reproduce content by reading out content data recorded in a recording medium, and a transmitting unit configured to transmit the content data representing the content being reproduced by the reproducing unit by way of wireless communication, and each of the other apparatuses of the plurality of content reproduction apparatuses may include a receiving unit configured to receive the transmitted content data, and a reproducing unit configured to decode the content data received by the receiving unit and reproduce the content.

7 Claims, 3 Drawing Sheets

CONTENT REPRODUCTION SYSTEM, CONTENT REPRODUCTION APPARATUS AND CONTENT REPRODUCTION METHOD

CROSS-REFERENCE TO RELATED APPLICATIONS

This application claims priority from Japanese Patent Application No. JP 2006-120776 filed in the Japanese Patent Office on Apr. 25, 2006, the entire content of which is incorporated herein by reference.

BACKGROUND OF THE INVENTION

1. Field of the Invention

The present invention relates to content reproduction systems, content reproduction apparatuses, and content reproduction methods used to reproduce content such as music.

2. Description of the Related Art

In recent years, portable music players, for example, have been broadly used. Desired content is stored in advance in a recording medium as content data, for example, and the stored content data is read out by a portable reproduction apparatus to reproduce the content, whereby a user listens to the desired content in any desired place.

The related art is disclosed in Japanese Patent Application No. 2005-352351.

SUMMARY OF THE INVENTION

A known portable content reproduction apparatus is used so that a user may listen to the content being reproduced. Therefore, people other than the user do not know what music the user with headphones on is listening to unless they ask the user, and therefore, the user may not share the content with other people.

Accordingly, it is desirable to provide a content reproduction system, a content reproduction apparatus, and a content reproduction method, in which the user can share and enjoy content with other people.

According to an embodiment of the present invention, there is provided a content reproduction system which may include a plurality of content reproduction apparatuses, wherein at least one of the plurality of content reproduction apparatuses may include reproducing means for reproducing content by reading out content data recorded in a recording medium, and transmitting means for transmitting the content data representing the content being reproduced by the reproducing means by way of wireless communication. In addition, each of the other apparatuses of the plurality of content reproduction apparatuses may include receiving means for receiving the transmitted content data, and reproducing means for decoding the content data received by the receiving means and reproducing the content.

According to another embodiment of the present invention, there is provided a content reproducing apparatus which may include first reproducing means for reproducing content by reading out content data recorded in a recording medium, transmitting means for transmitting the content data representing the content being reproduced by the first reproducing means by way of wireless communication, receiving means for receiving the content data transmitted from another content reproduction apparatus, and second reproducing means for decoding the content data received by the receiving means and reproducing the content.

According to a further embodiment of the present invention, there is provided a content reproduction method utilized in a content reproduction system which may include a plurality of content reproduction apparatuses, wherein at least one of the plurality of content reproduction apparatuses may reproduce content by reading out content data recorded in a recording medium and transmit the content being reproduced by way of wireless communication. In addition, each of the other content reproduction apparatuses may receive and decode the transmitted content data to reproduce the content.

Since at least one of the plurality of content reproduction apparatuses may reproduce content by reading out content data recorded in a recording medium, and transmit the content data representing the content being reproduced by way of wireless communication, and in addition, each of the other apparatuses of the plurality of content reproduction apparatuses may receive the transmitted content data and decode the content data to reproduce the content, the user may share and enjoy content with other people and a community including members having the same preference may be created. Furthermore, since distribution destinations may be limited to the friends of the user, the distribution may work as an efficient promotion of the distributed music by word of mouth.

DETAILED DESCRIPTION

An embodiment of the present invention will now be described in detail with reference to the accompanying drawings. A content reproduction system shown as an example of the present invention includes a plurality of content reproduction apparatuses. At least one of the plurality of content reproduction apparatuses reproduces content by reading out content data recorded in a recording medium and transmits the content data representing the content being reproduced by way of wireless communication. Other content reproduction apparatuses receive the transmitted content data, and then decode the content data to reproduce the content.

Note that although the content reproduction system in this embodiment uses wireless LAN (Local Area Network) as a wireless networking technique, the present invention is not limited to this. A configuration of the wireless LAN networking includes an infrastructure mode and an ad-hoc mode. In this embodiment, an ad-hoc mode is used as an example. In the ad-hoc mode, apparatuses directly communicate with one another without using access points. In addition, in this embodiment, although music is reproduced as an example of content, a video may be reproduced.

Figure 1:
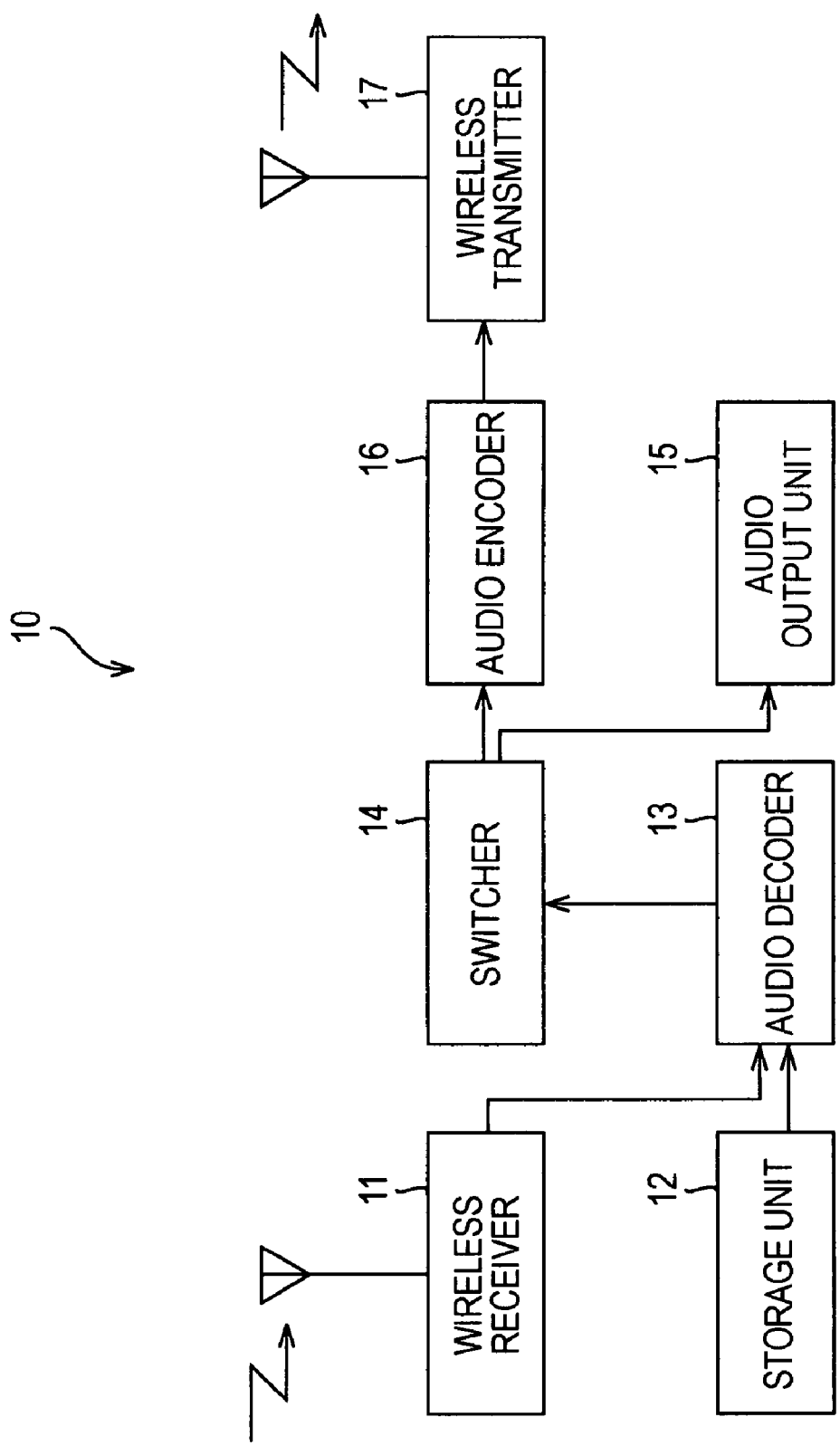
FIG. 1 shows a block diagram illustrating a configuration of a content reproduction apparatus according to an embodiment of the present invention.

FIG. 1 shows a block diagram illustrating a configuration of a content reproduction apparatus 10 according to the embodiment. The content reproduction apparatus 10 includes a wireless receiver 11, a storage unit 12, an audio decoder 13, a switcher 14, an audio output unit 15, an audio encoder 16, and a wireless transmitter 17. The wireless receiver 11 receives, through a wireless LAN, music streaming files such as Windows (trademark) Media music streaming files developed by Microsoft Corporation as signals prescribed in IEEE 802.11 standard. The storage unit 12 is a NAND flash memory or a hard disk, for example, and stores music files such as MP3 (MPEG Audio Layer-3) music files. The audio decoder 13 decodes the music streaming files and the music files such as the MP3 music files and the Windows Media music streaming files. The switcher 14 controls output destinations of audio signals generated by decoding the music streaming files and the music files in accordance with one of two modes which will be described later. The audio output unit 15 outputs, through a headphone terminal, for example, audio which is generated as audio signals by decoding the music files and the music streaming files using the audio decoder 13. The audio encoder 16 encodes the audio signals which were decoded using the audio decoder 13 to obtain streaming files such as Windows Media music streaming files. The wireless transmitter 17 transmits the streaming files which were encoded using the audio encoder 16 through the wireless LAN prescribed in IEEE 802.11 standard, for example. Note that although the wireless receiver 11 and the wireless transmitter 17 are separately provided for ease of description, a wireless transmission/reception unit is preferably provided as actual implementation.

The content reproduction apparatus 10 has two music reproducing modes which are a "distribution reproducing mode" used to reproduce the music files stored in the storage unit 12 and to distribute the music files as streaming files and a "reception reproducing mode" used to receive a streaming file from another apparatus and reproduce the received streaming file. Note that the reception reproducing mode is only used to reproduce content transmitted from another apparatus by a streaming method, and is not used for any reproducing operations including cue, fast-forward, fast-rewind, and recording.

Figure 2:
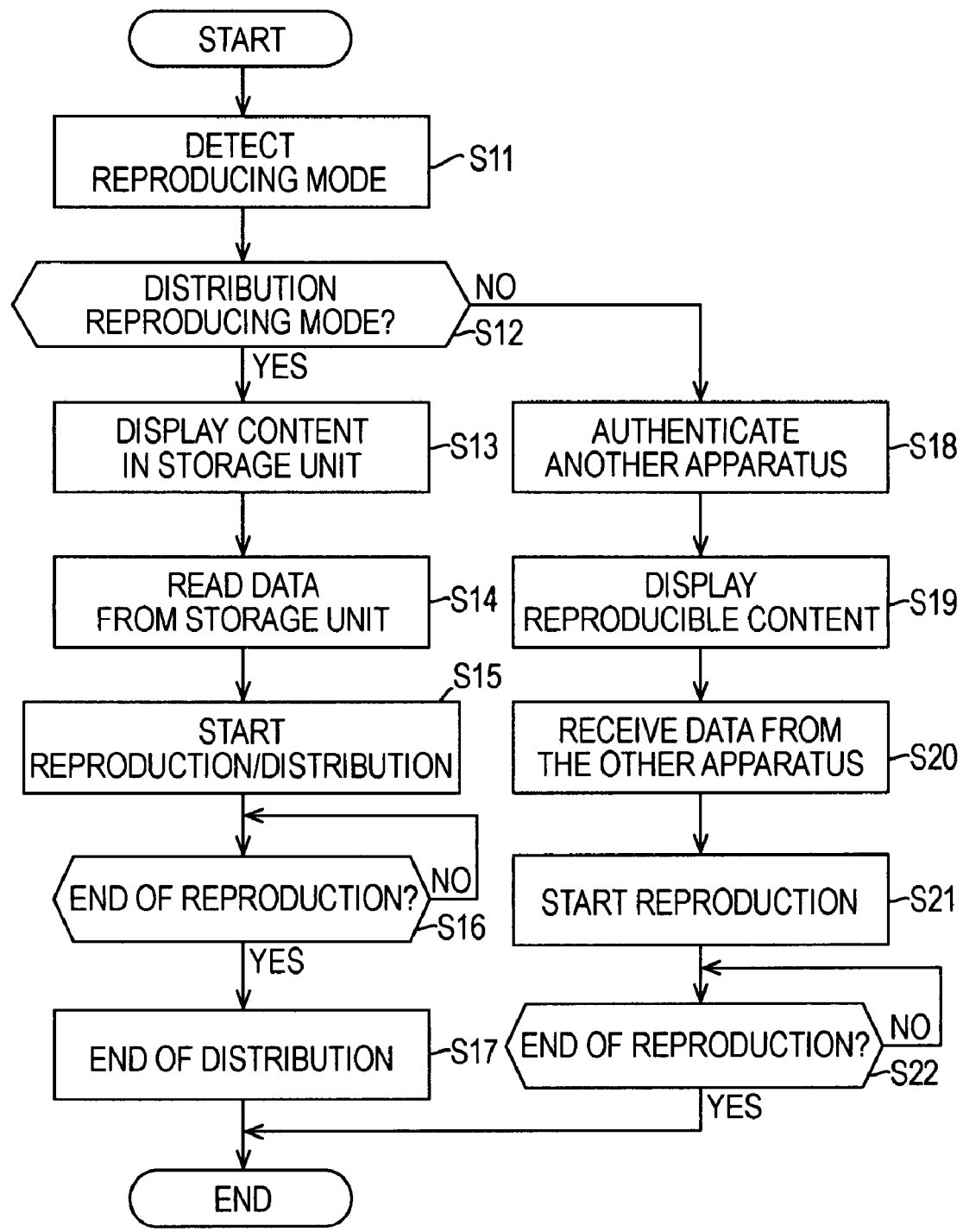
FIG. 2 is a flowchart illustrating an operation of reproducing content according to an embodiment of the present invention.

Reproducing operations in the distribution reproducing mode and in the reception reproducing mode will now be described. FIG. 2 is a flowchart illustrating a reproducing operation of the content reproduction apparatus 10. In step S11, the content reproduction apparatus 10 detects a press of a reproduction button and determines a reproducing mode. In step S12, when it is determined that the reproducing mode detected in step S11 is a distribution reproducing mode, the process proceeds to step S13 and the switcher 14 outputs audio signals decoded in the audio decoder 13 to the audio output unit 15 and the audio encoder 16. On the other hand, in step S12, when it is determined that the reproducing mode detected in step S11 is a reception reproducing mode, the process proceeds to step S18 and the switcher 14 outputs audio signals only to the audio output unit 15.

In step S13, the content reproduction apparatus 10 in the distribution reproducing mode displays the music files stored in the storage unit 12 on a display unit. The content reproduction apparatus 10 reads a music file selected by a user from the storage unit 12 (step S14) and starts reproducing and distributing (step S15). Specifically, the music file read from the storage unit 12 is decoded using the audio decoder 13 to generate audio signals and the audio signals are output from a headphone terminal of the audio output unit 15 through the switcher 14. Furthermore, the audio signals generated using the audio decoder 13 are encoded to generate streaming files and the streaming files are distributed from the wireless transmitter 17. A distribution operation will be described later.

In step S16, the content reproduction apparatus 10 determines whether the reproduction is terminated. When it is determined that the reproduction is terminated, the distribution is terminated (step S17). Note that the distribution is also terminated when the user instructs the termination of the distribution.

In step S12, when it is determined that the reproducing mode is not a "distribution reproducing mode", that is, the reproducing mode is a "reception reproducing mode", the content reproduction apparatus 10 periodically scans through the network, authenticates another apparatus in communication in an ad-hoc mode with the content reproduction apparatus 10 and is connected to the other apparatus (step S18). Then the content reproduction apparatus 10 acquires identification information of the other apparatus which is authenticated and content information of the content being reproduced, and displays, for example, the identification information and a content name as a list on the display unit (step S19). The content information preferably includes, for example, a content name, reproduction time, a copyright holder, and presence or absence of DRM (Digital Rights Management). The content information helps the user to select, for example, content having long remaining reproduction time or content reproducible using the DRM. Since the network identification information and the content information of the apparatus connected to the content reproduction apparatus 10 are displayed, the user selects an apparatus desired to be connected and content desired to be reproduced with ease.

In step S20, the content reproduction apparatus 10 requests streaming files of the other apparatus which is a distribution source apparatus of the content selected by the user and starts reproducing by a streaming method (step S21). For example, the content reproduction apparatus 10 sets a channel used for the wireless LAN communication with the selected distribution source apparatus distributing the streaming file. Then the content reproduction apparatus 10 acquires a key from the distribution source apparatus, decodes the streaming file received using the wireless receiver 11 using the audio decoder 13 in accordance with the key, and outputs audio signals through the switcher 14 from the headphone terminal or the like of the audio output unit 15. Note that the reproduction using a streaming method is started from a reproducing point of the distribution source apparatus.

Furthermore, the content reproduction apparatus 10 monitors a connection status in wireless communication between the content reproduction apparatus 10 and the distribution source apparatus and controls volume in accordance with the connection status in wireless communication. For example, if a reception level is lower than a threshold value A, the volume is controlled to be small in accordance with the reception level, and if the reception level is lower than a threshold value B (threshold value B<threshold value A), the volume is set to 0.

In step S22, the content reproduction apparatus 10 determines whether the reproduction by the streaming method is terminated. For example, when the reception level is low in accordance with the connection status in the wireless communication or when the distribution source apparatus stops reproducing, the reproduction by the streaming method is terminated.

Figure 3:
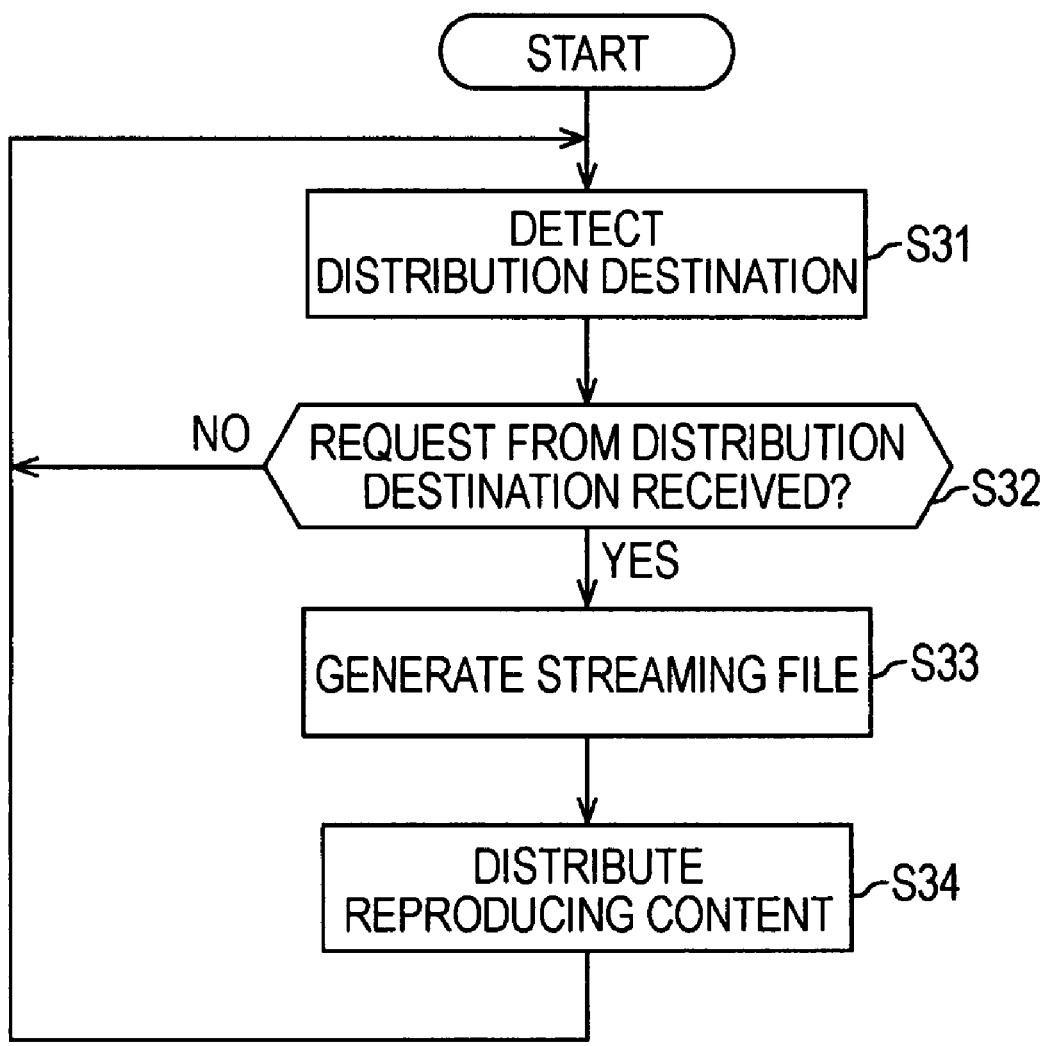
FIG. 3 is a flowchart illustrating an operation of distributing the content according to an embodiment of the present invention.

FIG. 3 shows a flowchart illustrating a distribution operation of the content reproduction apparatus 10. In step S31, the content reproduction apparatus 10 detects a distribution destination apparatus. For example, the content reproduction apparatus 10 periodically scans the network and authenticates another apparatus which is in communication in an ad-hoc mode, and transmits content information including a content name of a music file being reproduced by the content reproduction apparatus 10. The operation in step S31 is performed in a sleep mode which is an electrical-power saving mode until the distribution destination apparatus requests distribution of content.

In step S32, when the content reproduction apparatus 10 receives a request of content which is being reproduced from the distribution destination, the sleep mode is terminated. The content reproduction apparatus 10 supplies the audio signals to the audio encoder 16 in addition to the audio output unit 15 through the switcher 14, and generates streaming files of the content being reproduced (step S33).

In step S34, the content reproduction apparatus 10 exchanges keys with the distribution destination apparatus which requests the content and thereafter transmits the streaming files whereby the content being reproduced is distributed by a streaming method.

As described above, the content reproduction apparatus 10 has the "distribution reproducing mode" which is used to reproduce music files stored in the storage unit 12 and distribute the music files as music streaming files and the "reception reproducing mode" which is used to receive and reproduce the distributed music streaming files. Accordingly, the user enjoys content by himself/herself and further enjoys distributing the content to friends. In addition, although different preferences of music of different people have lead to less hit songs in recent years, a community including members having the same preference may be created by distributing the music which is the user's preference. Furthermore, since distribution destinations are limited to the friends of the user, the distribution works as an efficient promotion of the distributed music for so-called "music companies" which are copyright holders.

It should be understood by those skilled in the art that various modifications, combinations, sub-combinations and alterations may occur depending on design requirements and other factors insofar as they are within the scope of the appended claims or the equivalents thereof.

The invention claimed is:

1. A content reproduction system including a plurality of content reproduction apparatuses,
    wherein at least one of the plurality of content reproduction apparatuses includes:
    reproducing means for reproducing content by reading out content data recorded in a recording medium; and
    transmitting means for transmitting the content data representing the content being reproduced by the reproducing means by way of wireless communication, and
    wherein each of the other apparatuses of the plurality of content reproduction apparatuses includes:
    receiving means for receiving the transmitted content data; and
    reproducing means for decoding the content data received by the receiving means and reproducing the content,
    during operation, the at least one of the plurality of content reproduction apparatuses (i) performs an operation to detect one or more of the other apparatuses of the plurality of content reproduction apparatuses and an operation to transmit information about the content currently being reproduced, both operations being performed in a sleep mode so as to save power, and (ii) upon receipt of a request by a respective one of the other apparatuses of the plurality of content reproduction apparatuses for the content currently being reproduced terminates the sleep mode and causes requested content data to be transmitted.

2. The content reproduction system according to claim 1, wherein each of the other content reproduction apparatuses acquires identification information of the at least one of the content reproduction apparatuses which reads out the content data recorded in the recording medium and which reproduces the content and the content information of the content being reproduced and supplies the request for content in accordance with at least one of the identification information and the content information.

3. The content reproduction system according to claim 1, wherein each of the other content reproduction apparatuses reproduces the content while controlling the volume in accordance with a connection status of the wireless communication.

4. A content reproducing apparatus comprising:
    first reproducing means for reproducing content by reading out content data recorded in a recording medium;
    transmitting means for transmitting the content data representing the content being reproduced by the first reproducing means by way of wireless communication;
    receiving means for receiving the content data transmitted from another content reproduction apparatus; and
    second reproducing means for decoding the content data received by the receiving means and reproducing the content,
    during operation, the content reproduction apparatus (i) performs an operation to detect the another content reproduction apparatus and an operation to transmit information about the content currently being reproduced, both operations being performed in a sleep mode so as to save power, and (ii) upon receipt of a request by the another content reproduction apparatus for the content currently being reproduced terminates the sleep mode and causes requested content data to be transmitted.

5. A content reproduction method utilized in a content reproduction system including a plurality of content reproduction apparatuses, comprising:
    reproducing content by at least one of the plurality of content reproduction apparatuses by reading out content data recorded in a recording medium and transmitting the content being reproduced by way of wireless communication, and
    receiving and decoding the transmitted content data to reproduce the content by each of the other content reproduction apparatuses,
    further comprising
    performing, by the at least one of the plurality of content reproduction apparatuses, an operation to detect one or more of the other content reproduction apparatuses and an operation to transmit information about the content currently being reproduced, both operations being performed in a sleep mode so as to save power, and upon receipt of a request by a respective one of the other content reproduction apparatuses for the content currently being reproduced, terminating the sleep mode and causing requested content data to be transmitted.

6. A content reproduction system including a plurality of content reproduction apparatuses,
    wherein at least one of the plurality of content reproduction apparatuses includes:
    a reproducing unit configured to reproduce content by reading out content data recorded in a recording medium; and
    a transmitting unit configured to transmit the content data representing the content being reproduced by the reproducing unit by way of wireless communication, and
    wherein each of the other apparatuses of the plurality of content reproduction apparatuses includes:
    a receiving unit configured to receive the transmitted content data; and
    a reproducing unit configured to decode the content data received by the receiving unit and reproduce the content, during operation, the at least one of the plurality of content reproduction apparatuses (i) performs an operation to detect one or more of the other apparatuses of the plurality of content reproduction apparatuses and an operation to transmit information about the content currently being reproduced, both operations being performed in a sleep mode so as to save power, and (ii) upon receipt of a request by a respective one of the other apparatuses of the plurality of content reproduction apparatuses for the content currently being reproduced terminates the sleep mode and causes requested content data to be transmitted.

7. A content reproducing apparatus comprising:

a first reproducing unit configured to reproduce content by reading out content data recorded in a recording medium;

a transmitting unit configured to transmit the content data representing the content being reproduced by the first reproducing unit by way of wireless communication;

a receiving unit configured to receive the content data transmitted from another content reproduction apparatus; and a second reproducing unit configured to decode the content data received by the receiving unit and reproduce the content, during operation, the content reproduction apparatus (i) performs an operation to detect the another content reproduction apparatus and an operation to transmit information about the content currently being reproduced, both operations being performed in a sleep mode so as to save power, and (ii) upon receipt of a request by the another content reproduction apparatus for the content currently being reproduced terminates the sleep mode and causes requested content data to be transmitted.

* * * * *